United States Patent [19]
Farkas

[11] 3,733,162
[45] May 15, 1973

[54] INJECTION MOULDING TOOL

[76] Inventor: Francis Farkas, c/o Clearplass Containers Ltd., P.O. Box 241, Phelps, N.Y. 14532

[22] Filed: June 19, 1970

[21] Appl. No.: 47,841

[52] U.S. Cl. ............... 425/249, 425/324, 425/451, 425/436
[51] Int. Cl. ............................................. B29d 23/03
[58] Field of Search ............... 18/5 BM, 5 BP, 5 BI, 18/5 BB, 5 BA, 5 BR, 20 B, 2 RM; 425/436, 242, 444, 246, 249, 248, 324, 326, 451

[56] References Cited

UNITED STATES PATENTS

| | | |
|---|---|---|
| 3,609,803 | 10/1971 | Fattori ........................... 425/249 X |
| 2,853,736 | 9/1958 | Gussoni ............................... 18/5 BJ |
| 3,100,913 | 8/1963 | De Matteo ....................... 18/5 BJ X |
| 2,953,815 | 9/1960 | Mainardi ..................... 18/5 BJ UX |
| 3,116,516 | 1/1964 | Moslo ........................... 18/5 BP UX |
| 3,390,427 | 7/1968 | Ruekberg ........................... 18/5 BJ |

Primary Examiner—J. Spencer Overholser
Assistant Examiner—Michael O. Sutton
Attorney—Douglas S. Johnson

[57] ABSTRACT

A plastic moulding apparatus in which a core-carrier head is arranged between the counter-moulding plate and the nozzle moulding plate, the said carrier-head being pivotable through 90° about an axis perpendicular to the direction of closing of the moulding plates; in the blowing-mould halves adapted to each other are seated on the moulding plates, the mould halves accepting the core in the pivoted position and swinging out of the injection-moulding position when the moulding plates are in the closed position, the core being equipped with a blowing nozzle.

8 Claims, 10 Drawing Figures

INVENTOR.
FRANCIS FARKAS
BY Douglas L. Johnson
Attorney

INVENTOR.
FRANCIS FARKAS

//PATENT_NUM: 3,733,162

INJECTION MOULDING TOOL

FIELD OF THE INVENTION

The invention relates to an injection-moulding tool having a nozzle moulding plate, a counter-moulding plate, and at least one core held to the latter, it being possible to move at least the counter-moulding plate on guide bars.

PRIOR ART

Blown plastic parts have numerous advantages over injection-moulding parts, since the blowing process makes it possible to produce hollow parts which either cannot be produced at all by injection-moulding, or can be so produced only at considerable expense. A so-called extrusion-blowing process is known, starting from an extruded tube. In this case, the finished parts have relatively high internal stresses, as well as weld locations or weld seams, rendering a finishing operation necessary under certain circumstances. The wall thickness of the finished parts lacks uniformity, especially in the vicinity of sharp corners and edges because in the blowing-mould the material is inadequately guided.

An attempt might be made to process injection-moulded blanks further in blowing-moulds, but this method is unusable in practice since, for proper blowing, the blanks would have to undergo additional heating.

It is the aim of the invention to produce a tool which makes it possible to use a combined injection-moulding/blowing technique on one and the same machine, and to produce blown parts economically.

SUMMARY OF THE INVENTION

According to the invention, this aim is accomplished in that a core-carrier head is arranged between the counter-moulding plate and the nozzle moulding plate, the said carrier head being pivotable through 90° about an axis perpendicular to the direction of closing of the moulding plates; in that blowing-mould halves adapted to each other are seated on the moulding plates, the said mould halves accepting, the core in the pivoted position swung out of the injection-moulding position when the moulding plates are in the closed position; and in that the core is equipped with a blowing nozzle.

The carrier head preferably accommodates two blowing cores at 90° from each other; blowing mould halves are also provided on both sides of the injection-moulding nozzle.

The injection-moulding tool according to the invention may also be made in the form of a multiple tool, this being governed mainly by the capacity of the relevant injection-moulding machine.

The injection-moulding tool according to the invention makes it possible to produce blown parts or injection-moulded-blown parts on a conventional injection-moulding machine. In one position of the carrier head, a blank is moulded on a core by injection, while on the other core, used as a blowing core, the blank produced in the preceding operating cycle is processed into a finished blown part. The injection moulding tool according to the invention operates in time with the injection-moulding machine one workpiece or, in the case of a multiple tool, several workpieces being produced per cycle. The finished parts have relatively low internal stresses, there are no weld locations or seams, wall thickness is very uniform, since this may be controlled by the shaping of the blank and especially by the shaping of the blowing core, and the parts are free of burrs and require no finishing.

Additional characteristics of the invention appear in the sub-claims.

BRIEF DESCRIPTION OF THE DRAWINGS

The invention is explained in the following description with the aid of the preferred example of embodiment illustrated in the attached drawings, wherein.

DESCRIPTION OF THE PREFERRED EMBODIMENT

An injection-moulding tool according to the invention is in the form of a transversely divided tool (i.e. divided transversely to the direction of closing of the injection-moulding machine). Each half of the tool consists of carrier plates, various distance pieces, moulding plates, mould inserts, cores, ejectors, nozzle heads, and the like. These parts are, largely, known parts of injection-moulding machines and will therefore not be described in detail. They are mounted on the guide bars of the injection-moulding machine and are displaceable, the drive therefor being preferably by means of hydraulic cylinders.

Figure 1:
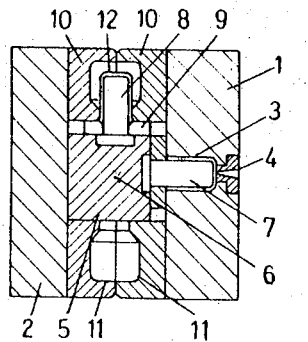
FIG. 1 is a schematic section of an injection-moulding tool according to the invention in a first operative position.

FIG. 1 shows a nozzle-moulding plate 1 and a counter-moulding plate 2 of the tool according to the invention. Located within the nozzle moulding plate is a moulding chamber 3 in a mould insert, not shown. Nozzle moulding plate 1 also accommodates an injection nozzle 4. An important structural element of the injection-moulding tool according to the invention is a pivotable core-carrier head 5, seated on a separate frame, a description of which is as follows: the said carrier head may be moved independently of the counter moulding plate and is pivotable about an axis 6 (perpendicular to the plane of the drawing). It carries preferably two cores 7 and 8, and stripper plates 9. Cores 7 and 8 are in the form of so-called blowing cores, i.e. each is equipped with a blowing nozzle to be described hereinafter. Nozzle moulding plate 1 and counter-moulding plate 2 each carry blowing-mould halves 10 and 11 adapted to each other. Two blowing-mould halves 10 and 11 form a blowing mould, together with blowing cores 7 and 8 associated therewith.

Figure 2:
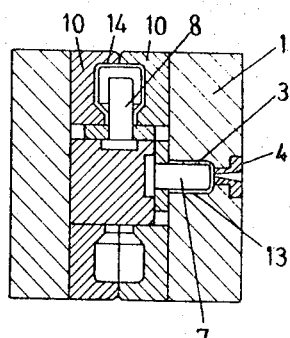
FIGS. 2 to 6 show the tool in FIG. 1 in other operative positions.
Figure 3:
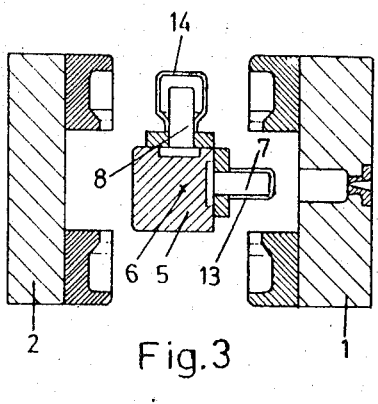
Figure 4:
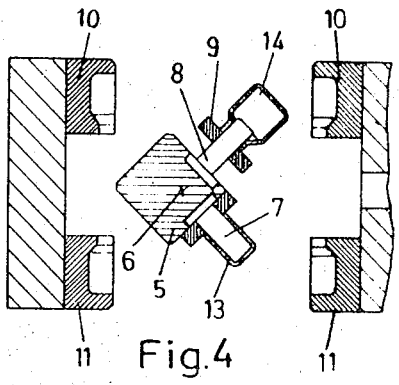
Figure 5:
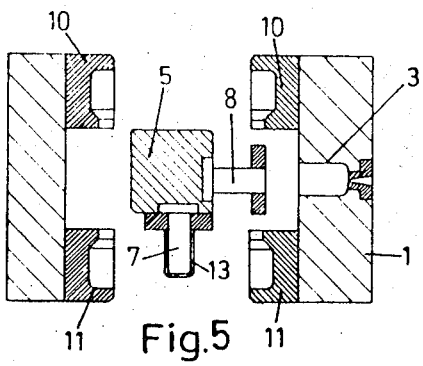
Figure 6:
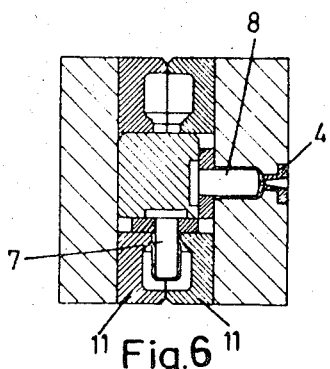

The method of operation of the injection-moulding tool according to the invention will best be understood from an explanation of the complete operating cycle and with the aid of FIGS. 1 to 6. FIG. 1 shows the injection-moulding tool in the closed position immediately after the closing movement has been completed. Core 8 is carrying a blank 12 completed in the preceding injection-moulding cycle, the said blank being located in the blowing chamber formed out of blowing-mould halves 10. Core 7 is empty and is located in moulding chamber 3 of nozzle plate 1. Upon completion of the closing movement, the combined injection-blowing cycle is initiated. (FIG. 2). Material is injected from nozzle 4 into moulding chamber 3, a new blank 13 being thus formed. At the same time, the nozzle in blowing core 8 is placed under pressure, so that blank 13 inside the blowing chamber is blown up into a finished part 14. Nozzle moulding plate 1 and counter-moulding plate 2 thereupon move away from each other, as in FIG. 3, core-carrier head 5 being simultaneously lifted away from countermoulding plate 2. Blank 13 and finished part 14 are seated respectively on cores 7 and 8. With the tool in the open position, core-carrier head 5 pivots, in relation to axis 6, through 90° clockwise, as shown in FIG. 4. This swings core 7 with blank 13 into the operating range of blowing-mould halves 11. Coupled with the swinging movement is the movement of stripper plate 9 of core 8, whereby finished part 14 is stripped off. At the end of this pivoting motion, core 8 is located, as shown in FIG. 5, within the working range of moulding chamber 3, while core 7 is within the working range of blowing-mould halves 11. Core-carrier head 5 is now in position for another injection-blowing cycle. The tool is brought up by the actuating devices on the injection-moulding machine (FIG. 6), whereby blowing-mould halves 11 are closed. Core 8 is now inside moulding chamber 3. The closing movement is followed by an injection cycle, new material for forming a blank being injected on to core 8 from the injection nozzle; combined therewith is a blowing cycle in the blowing chamber consisting of blowing-mould halves 11, whereby blank 13 is made into a finished part. This operating cycle corresponds to the operating cycle of FIG. 2. This tool now opens again and the core-carrier head swings through 90° counterclockwise, the finished part being thus stripped from core 7. After this pivoting motion has been carried out and the tool has been closed, the parts thereof are once more in the position shown in FIG. 1.

Axis 6 preferably runs in a vertical direction, since this makes it possible to pivot the carrier head without balancing it. If axis 6 runs horizontally inside the injection-moulding machine, special measures have to be taken to compensate for the eccentricity of the said carrier head.

According to the invention, therefore, the combination of a blowing cycle with a simultaneous injection cycle in each operating cycle of the injection-moulding machine produces a finished part. Blowing is carried out alternately in one of two blowing chambers. Since the cores for the alternately used blowing chambers are brought in and adjusted during one opening stroke of the injection-moulding machine, the blanks have little opportunity to cool down, and reheating prior to blowing is unnecessary. The invention thus makes it possible to use a fast cycle sequence on a conventional injection-moulding machine.

Figure 7:
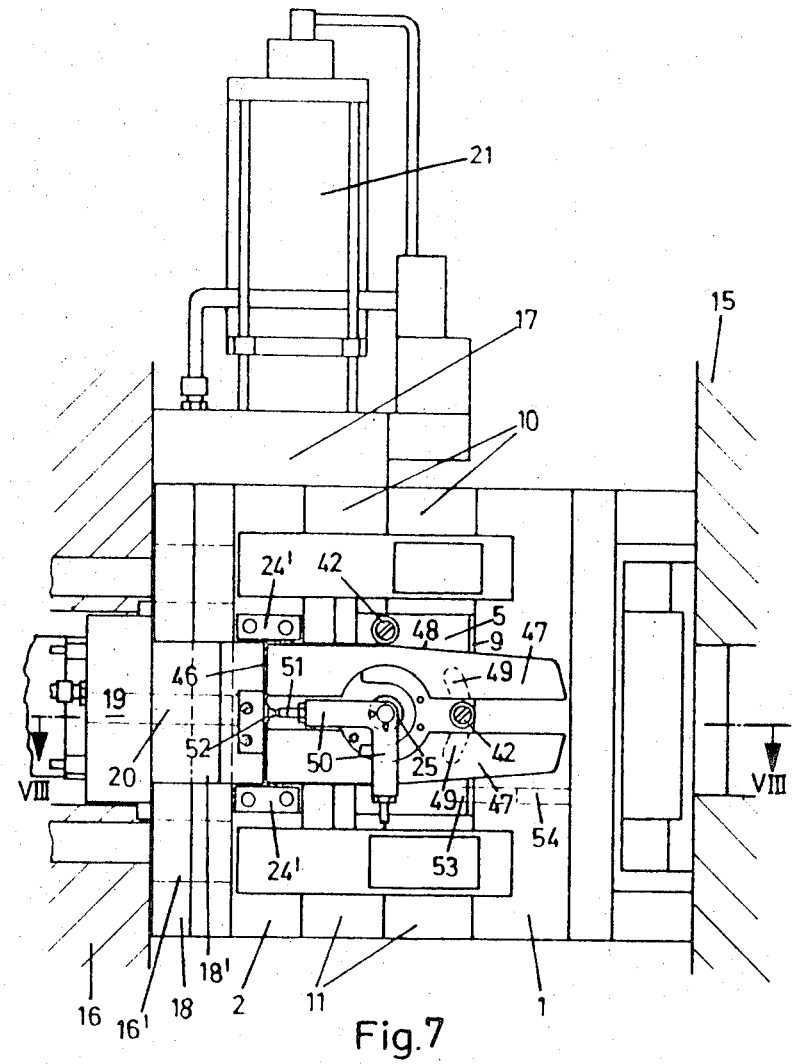
FIG. 7 is an enlarged view of the tool, with special representation of the carrier head, as seen in the direction of the axis of pivot thereof.

The construction of a tool according to the invention will now be described in detail with the aid of FIGS. 7 to 10. FIG. 7 is a schematic representation of a nozzle-carrier plate 15 on which a nozzle moulding plate 1 is seated, with the interposition of various distance pieces. Shown in the other side is a carrier plate 16 on which counter-moulding plate 2 is seated, again with the interposition of distance pieces 16'. The injection-moulding-machine guide bars for the tool are not shown. A frame for core-carrier head 5 consists of a retaining plate 17, a traverse plate 18, and bearing end plates 24. Attached to traverse plate 18 is the casing of a hydraulic cylinder 19, piston rod 20 of which is let into counter-moulding plate 2. The latter carries guide bars 24', between which bearing plates 24 are guided on the top and bottom of the tool. The double-acting hydraulic cylinder thus makes it possible to adjust the core-carrier-head frame within guide bars 24' of counter-moulding plate 2. Seated on retaining plate 17 is an additional hydraulic cylinder 21, piston rod 22 of which is coupled to a rack 23, FIG. 9. Bearing plates 24 each accommodate a pin 25 on core-carrier head 5, the latter being therefore pivotable about the said pins. The said core-carrier head 5 also has a toothed segment part 26 which engages with rack 23. When the injection-moulding tool according to the invention is in the form of a dual tool, the said toothed-segment part 26 is preferably located at the center of the core-carrier head. With the aid of toothed-segment part 26, racks 23 can convert the movement of piston rod 22 into a pivoting movement of the core-carrier head.

Figure 10:
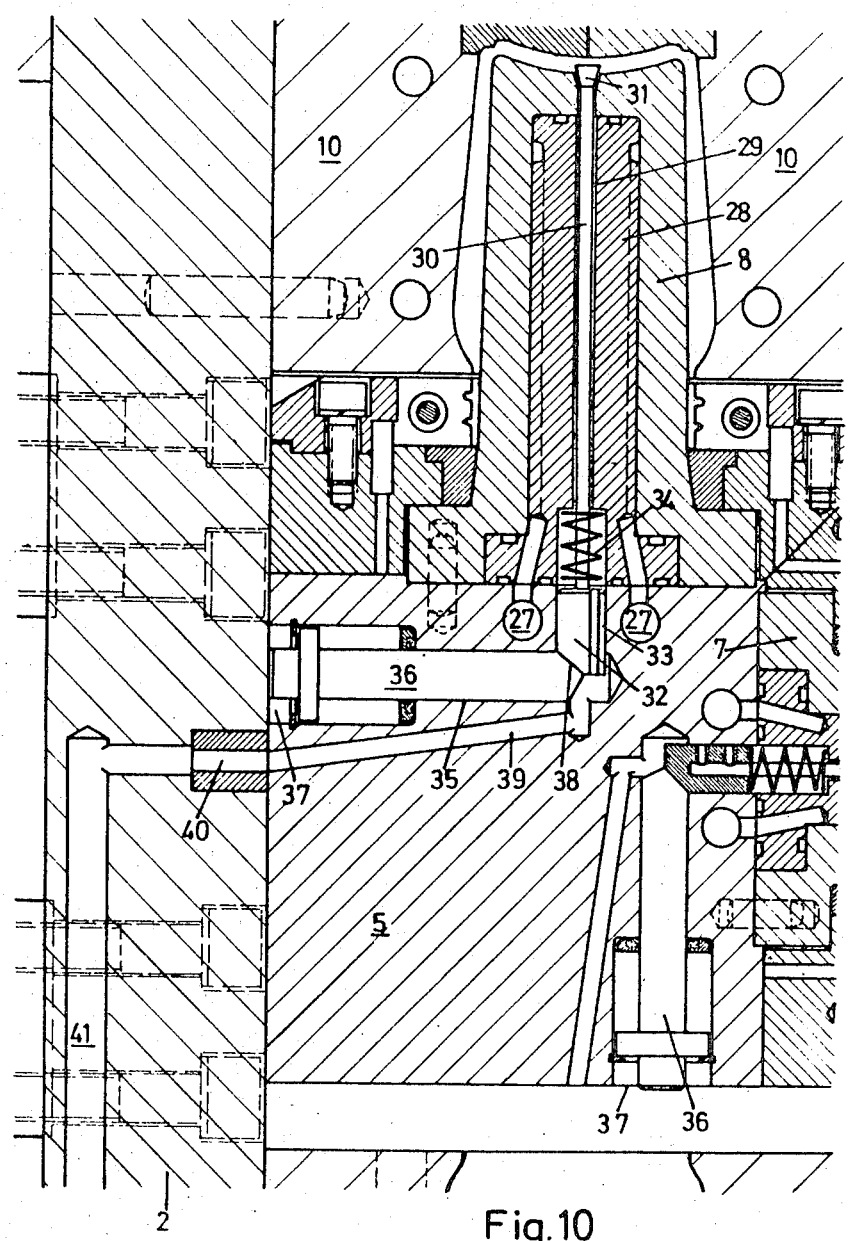
FIG. 10 shows a section along the line X—X in FIG. 8.

The core-carrier head accommodates two cores 7 and 8 displaced through 90° in relation to each other within a plane radial to pivot axis 6, only core 8 being shown complete in FIG. 10. In the case of a multiple tool, several such core groups are arranged consecutively along the pivot axis, i.e. spatially one above the other. Each core 8 is adapted in shape to the relevant blank, and is connected to core-carrier 5 in a conventional manner by pins and other means of attachment. Passages 27 are used to heat insert 28. Oil heating may be used as shown, otherwise electrical heating is also possible. Located substantially centrally within the core is a passage 29 accommodating a valve stem 30 and a valve insert 31. Valve stem 30 continues on into an adjusting head 32 projecting into a bore 33 inside core-carrier head 5. A helical spring 34 loads valve insert 31 into the closed position. Opening transversely into bore 33 is a bore 35 containing a pressure pin 36 which rests, in an opening area 37, against one wide side of the core-carrier head. Pressure pin 36 also has a sealing element. Pressure pin 36 and adjusting head 32 have wedge surfaces 38 adapted to each other. Helical spring 34 loads valve stem 30 in the closing direction, whereby the end-face of pressure pin 36 is lifted out of the opening area 37; see the bottom of FIG. 10. Also opening into bore 33 is a passage 39 for compressed air. FIG. 10 shows a set up for the core-carrier head in which core 8 is located within the blowing chamber formed by mould halves 10. Passage 39 is aligned with a compressed-air passage 40 in counter-moulding plate 2, so that compressed air may reach valve insert 31 through line 41, passage 40, passage 39, bore 35, and passage 29. With the injection-moulding tool in the closed position shown in FIG. 10 pressure pin 36 is pushed in by striking moulding plate 2, and valve insert 31 is lifted from the valve face. This makes it possible for blowing air to flow into blowing core 8, and thus to blow the blank into a finished part. FIG. 10 also shows the actuating elements and lines for core 7 which, in the position shown in FIG. 10, is located in moulding chamber 3 in the nozzle moulding plate. In this case, the air lines do not carry compressed air.

Figure 8:
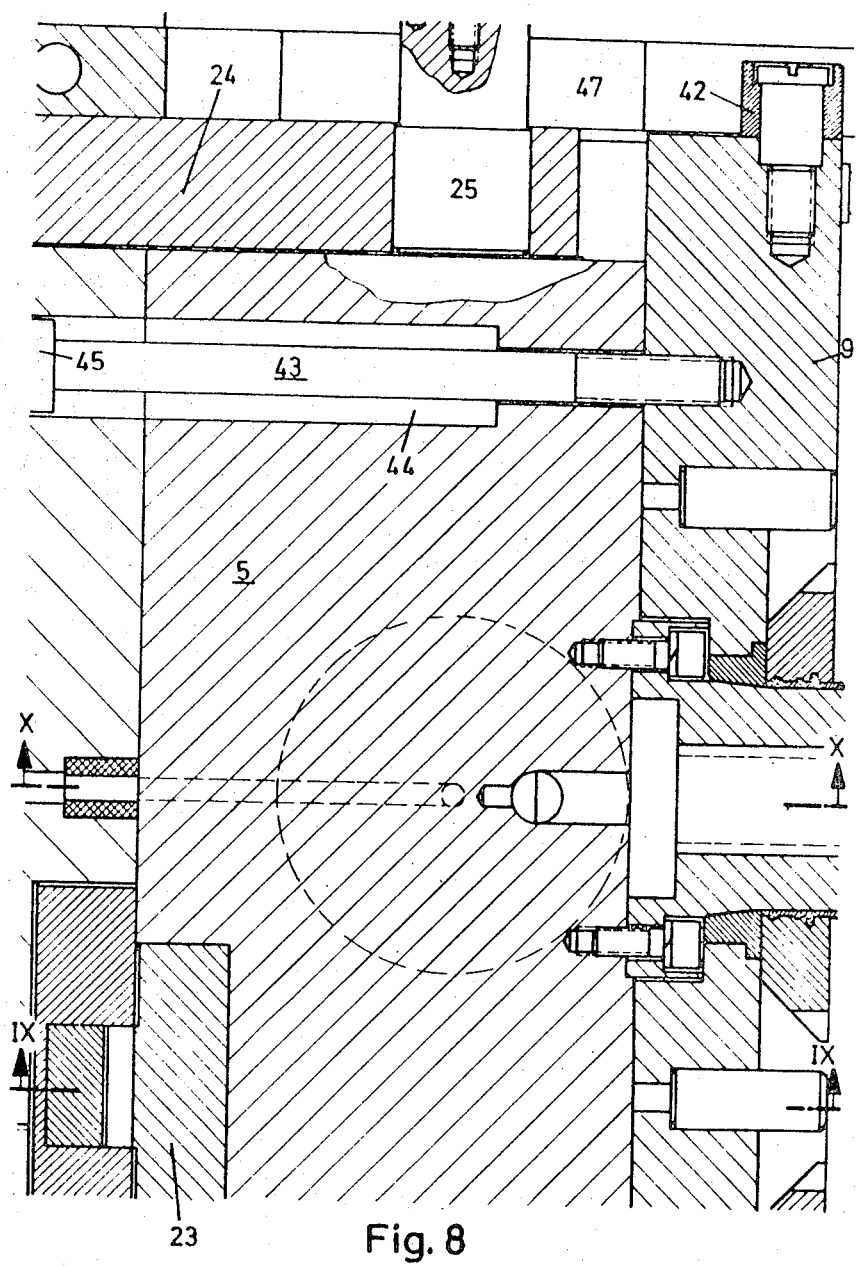
FIG. 8 shows an again enlarged part-section along the line VIII—VIII in FIG. 7.
Figure 9:
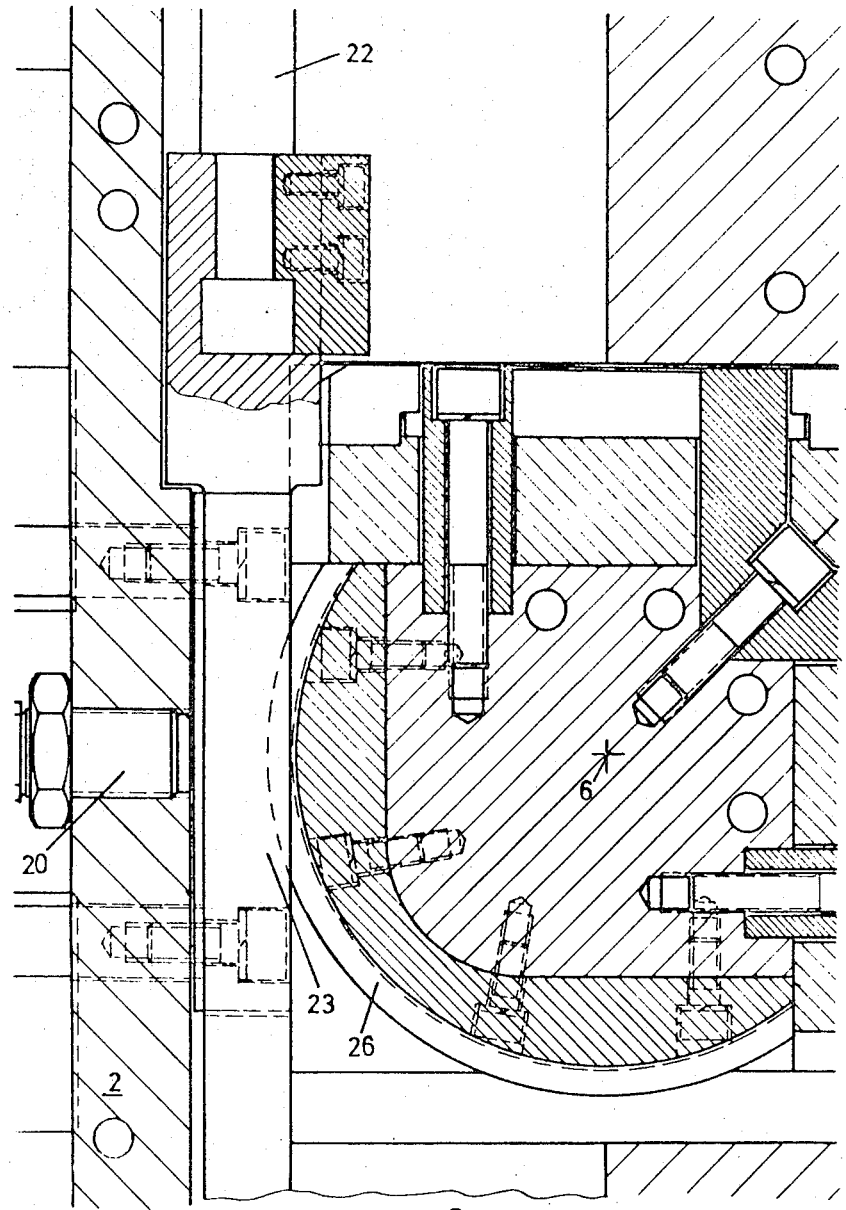
FIG. 9 shows a section along the line IX—IX in FIG. 8.

Stripper plate 9 is controlled by means of rollers 42, FIGS. 7 and 8. Stripper plate 9 is also guided, with the aid of stop-pin 43, in a passage 44 in core-carrier head 5. Stop-pin 43 has a stop-shoulder 45. Rollers 42 are preferably fitted on both sides of stripper plate 9. Located on both sides, for the purpose of controlling rollers 42, are two profile plates 47 which are held in pivot bearings 46 and are thus respectively pivotable in the direction of the pivot axis of core-carrier head 5. Also provided for profile plates 47 are return devices, not shown, which keep the said profile plates in position against the sides of core-carrier head 5. Each plate 47 has a guide profile 48 on which the relevant roller 42 runs, this raising stripper plate 9 to the head of the core. Also incorporated into the inside of each guide plate 47 is a wedge-shaped channel 49, into which roller 42 for the core aligned with the moulding chamber can enter when the carrier head pivots in a clockwise direction, as shown in FIG. 7 for example. This lifts the guide plate, so that the stripper plate of the relevant core is not actuated. In the position shown in FIG. 7 only upper roll 42 is influenced by the respective guide profile 48, the finished part being stripped from core 8 in accordance with the motion from FIG. 3 to FIG. 5. The stripper plate remains lifted and is returned to its starting position when the halves of the tool are brought together.

The various parts of the tool engage with each other by means of guide pins, thus ensuring correct functioning at all times. The guide pins between the halves of the tool are not shown. In order to ensure accurate alignment between core-carrier head 5 and moulding plates 1 and 2, carrier head 5 is fitted with guide pins 53, one of which is shown in FIG. 7. Nozzle moulding plate 1 has corresponding bores 54 for the accommodation of guide pins 53. In order to rule out a malfunction of the machine, sensor arms 50 are placed on the pivot axis of the core-carrier head, on each of which is seated a key for a microswitch 52. In this way, the correct alignment of the carrier head may be checked when the tool is moved up.

Hydraulic cylinders 19 and 21 are involved in the total control of the machine tool. Arranged at the various tool plates are microswitches and sensors which initiate the the various control functions; these elements are not shown in the drawings. Hydraulic cylinders 19 and 21 may thus be acted upon with compressed air during appropriate phases of movement of the injection-moulding machine, so that core-carrier head 5 may be timed correctly in the manner explained in connection with FIGS. 1 to 6.

The injection-moulding machine according to the invention may be used to produce any desired blown elements. More particularly, the tool according to the invention may be used to produce bottle-like receptacles, glasses with indrawn edges, and the like. If the blown part is to have a threaded flange, corresponding plates for forming the thread are provided in the moulding plates. Details of this kind are not shown.

I claim:
1. An injection-moulding tool having a nozzle-moulding plate and a counter-moulding plate, an injection nozzle accommodated by said nozzle-moulding plate, a core-carrier head arranged between the counter-moulding plate and nozzle-moulding plate and being capable of pivoting through 90° about a pivot axis perpendicular to the closing direction of the mould plates, said core-carrier head being adapted to carry two moulding cores thereon spaced 90°. about the pivot axis from each other; at least one pair of blowing-mould halves adapted to face each other to form a blowing chamber and being seated on one of each of the pair of mould plates respectively, said pair of blowing-mould halves accommodating either of said cores when pivoted on said core-carrier head out of the injection position and when the mould plates are closed; each said core having a blowing nozzle which can be operated when the core is accommodated by a pair of blowing-mould halves; the direction of injection being in the direction of closing of said mould plates; each said core having a stripper plate associated therewith, a guide roller on each side thereof and a pair of guide profile plates for each core, arranged so as to be pivotable in the direction of said pivot axis; and a wedge-shaped channel formed in the inside of each said guide plate.

2. An injection-moulding tool according to claim 1, where the pivot axis of the carrier head is vertical.

3. An injection-moulding tool according to claim 1, where two blowing-mould halves are provided, one on each side of the injection nozzle.

4. An injection-moulding tool according to claim 3, where the core-carrier head is seated in a frame capable of being moved on guide bars, said frame being displaceable away from the counter-moulding plate.

5. An injection-moulding tool according to claim 4, where the casing of a double-acting hydraulic cylinder is connected to the frame, and the piston thereof is connected to said counter-moulding plate.

6. An injection-moulding tool according to claim 4, where the core-carrier head has a toothed-segment part arranged perpendicularly to the pivot axis and engaged with a rack controlled by a hydraulic cylinder so as to cause pivoting motion of said core-carrier head upon linear motion of said rack.

7. An injection-moulding tool according to claim 1, where a plurality of groups of cores is arranged on said core-carrier head consecutively in an axial direction for the purpose of forming a multiple tool.

8. An injection-moulding tool according to claim 1, where each core has a blowing valve communicating with a compressed-air duct inside the carrier head; and further including an adjusting device, preloaded to the closed position, having a pressure pin which is actuated when the blowing-mould halves of the tool come together, for the purpose of opening a blowing nozzle located in the blowing chamber.

* * * * *